United States Patent [19]

Kawabata et al.

[11] Patent Number: 5,019,200
[45] Date of Patent: May 28, 1991

[54] METHOD OF FABRICATING MULTILAYER CAPACITOR

[75] Inventors: Shoichi Kawabata; Toshimi Yoshimura, both of Nagaokakyo, Japan

[73] Assignee: Murata Manufacturing Co., Ltd., Japan

[21] Appl. No.: 451,300

[22] Filed: Dec. 15, 1989

[30] Foreign Application Priority Data

Dec. 15, 1988 [JP] Japan .................................. 63-317359

[51] Int. Cl.$^5$ .............................................. B32B 31/18
[52] U.S. Cl. ...................................... 156/245; 156/257; 156/264; 156/268; 156/270; 156/497
[58] Field of Search ................. 156/89, 245, 260, 264, 156/512, 518, 520, 530, 497, 257, 268, 270; 264/63, 86, 67

[56] References Cited

U.S. PATENT DOCUMENTS

| | | | |
|---|---|---|---|
| 4,025,382 | 5/1977 | Del Rosso | 156/497 |
| 4,181,554 | 1/1980 | Rich | 156/518 |
| 4,255,220 | 3/1981 | Kucheck et al. | 156/497 |
| 4,526,635 | 7/1985 | Heinrich et al. | 156/85 |
| 4,539,058 | 9/1985 | Burgess et al. | 156/264 |
| 4,587,068 | 5/1986 | Borase et al. | 264/63 |

*Primary Examiner*—Caleb Weston
*Attorney, Agent, or Firm*—Ostrolenk, Faber, Gerb & Soffen

[57] ABSTRACT

A method of fabricating a multilayer capacitor including a series of steps of applying an electrode paste on a ceramic green sheet supported on a supporting film, cutting the ceramic green sheet to a predetermined size by employing a cutting head having drawing means, stripping the cut ceramic green sheet from the supporting film with the ceramic green sheet being held in the cutting head, transferring the ceramic green sheet held in the cutting head to a metallic pressing mold, and laminating a plurality of ceramic green sheets in the metallic mold to obtain a laminated body by repeating the above step of stripping the ceramic green sheet from the supporting film and the above step of transferring the ceramic green sheet to the metallic mold.

7 Claims, 2 Drawing Sheets

METHOD OF FABRICATING MULTILAYER CAPACITOR

BACKGROUND OF THE INVENTION

1. Field of the Invention

The present invention relates generally to a method of fabricating a multilayer capacitor, and more particularly, to a method of fabricating a multilayer capacitor comprising improved steps of forming, laminating and applying pressure to a ceramic green sheet.

2. Description of the prior Art

In the heretofore well-known method of fabricating a multilayer capacitor, a ceramic green sheet mainly composed of dielectric ceramic is first formed on a supporting film by a doctor blade process. The ceramic green sheet formed is then stripped from the supporting film and Is further cut so as to have a predetermined area. An electrode paste for forming an inner electrode is printed on the surface of a ceramic mother green sheet obtained by cutting and then, a plurality of ceramic mother green sheets are laminated and heat pressed by applying pressure, to obtain a laminated body. Then the laminated body is cut into several respective laminated bodies of predetermined area for each multilayer capacitor is sintered, and is followed by the steps such as the step of providing an outer electrode, thereby to obtain a multilayer capacitor.

In the multilayer capacitor, a plurality of inner electrodes are laminated and separated by dielectric ceramics. Accordingly, the multilayer capacitor is small in size and large in capacity. However, a smaller-sized and larger-capacity capacitor is desired. In order to increase the size and capacity of the multilayer capacitor, dielectric ceramics having a high dielectric constant should be used. Alternatively, a thinner ceramic green sheet should be used.

When a thinner ceramic green sheet is used, however, lack of strength of the ceramic green sheet causes the ceramic green sheet to be, for example, torn, crumpled, or shifted position from the time when the ceramic green sheet is stripped from a supporting film to the time when it is laminated. As a result, a large-capacity capacitor as designed cannot be reliably obtained. Consequently, it is actually very difficult in terms of handling to fabricate a multilayer capacitor using ceramic green sheet having a thickness of 20 μm or less.

On the other hand, Japanese Patent Laid-Open Gazette No 102216/1988, equivalent to co-pending Ser. No. 07/347,498 filed May 4, 1989, commonly assigned, discloses method of processing a ceramic green sheet for a multilayer capacitor in which cutting precision can be heightened even when a very thin ceramic green sheet is used. In the method disclosed in this prior art, a ceramic green sheet for a multilayer capacitor is first formed on the upper surface of a carrier film. Only the ceramic green sheet is then cut by a cuttIng head having a drawing portion with the ceramic green sheet being supported on the carrier film. The cut ceramic green sheet is drawn into the cutting head, to be taken out. More specifically, in this method, the ceramic green sheet is cut on the carrier film and then, the cut ceramic green sheet is stripped from the carrier film, thereby preventing the ceramic green sheet from being, for example, torn or crumpled. In this prior art, however, the steps after obtaining the ceramic green sheet out are not described except that a predetermined number of ceramic green sheets are laminated to obtain a laminated body, the laminated body obtained is diced into capacitors, and the laminated body cut is sintered.

Furthermore, the above described prior art discloses the step of drawing the cut ceramic green sheet out into the cutting head and holding the same therein, but fails to disclose the step of separating the ceramic green sheet which is already cut, from the cutting head.

SUMMARY OF THE INVENTION

Accordingly, an object of the present invention is to provide a method which allows a small-sized and large-capacity multilayer capacitor to be reliably obtained using a thinner ceramic green sheet.

The present invention provides a method of fabricating a small-sized and large-capacity multilayer capacitor using a thinner ceramic green sheet and 1 characterized by comprising the steps of preparing a ceramic green sheet formed with it being supported on a supporting film; applying an electrode paste for forming an inner electrode on the above ceramic green sheet; cutting the ceramic green sheet on the supporting film to a predetermined size by a cutting head having drawing means and drawing and holding the ceramic green sheet into the cutting head to strip the same from the above supporting film; transferring the ceramic green sheet held in the cutting head to a metallic mold for pressing; and laminating a plurality of ceramic green sheets in the metallic mold for pressing to obtain a laminated body by repeating the step of stripping the ceramic green sheet of predetermined size from the supporting film and the step of transferring the ceramic green sheet to the metallic mold for pressing.

According to the present invention, the ceramic green sheet is prepared with it being formed on the supporting film, coated with the electrode paste for forming an inner electrode, and then cut and held in the cutting head until it is laminated. Consequently, even when a very thin ceramic green sheet having a thickness of 20 μm or less is used, which is so thin that it cannot be handled, the ceramic green sheet can be reliably prevented from being deformed, for example, crumpled or torn. In addition, the very thin ceramic green sheet can be laminated with high precision.

Therefore, a small sized and large-capacity multilayer capacitor can be reliably fabricated using a thin ceramic green sheet which is otherwise very difficult to handle.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a cross sectional view showing the step of transferring a ceramic green sheet held in a cutting head to a metallic mold for pressing, FIG. 2 (a) is a cross-sectional view showing a step in which the ceramic green sheet is formed on a supporting film, and FIG. 2 (b) is a cross-sectional view showing a step in which an electrode paste is printed, and FIG. 3 is a cross-sectional view showing an internal structure of the cutting head.

DESCRIPTION OF THE PREFERRED EMBODIMENTS

Figure 1:
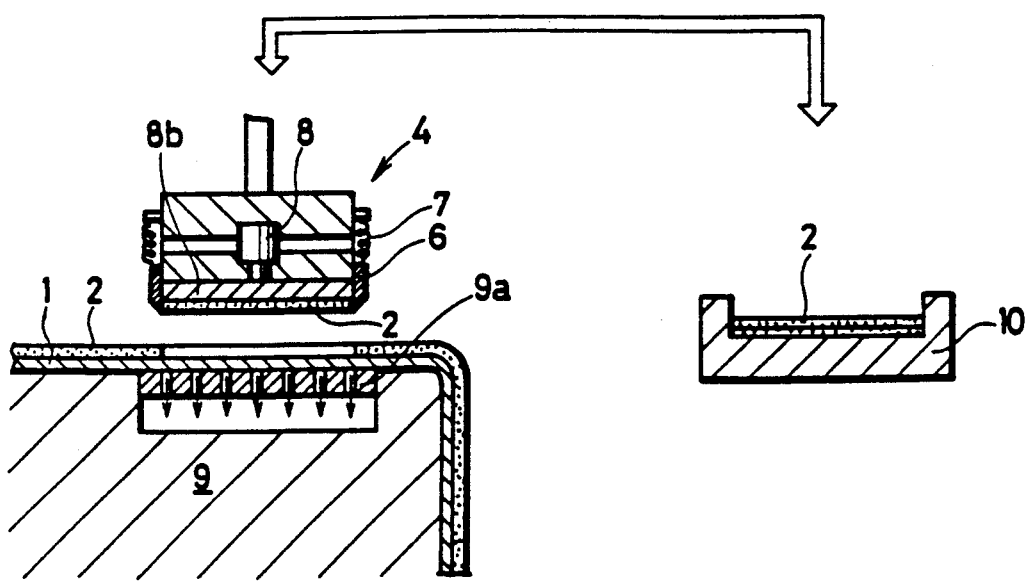
FIGS. 1 to 3 are cross sectional views for explaining a first embodiment of the present invention, where

Referring now to the drawings, embodiments of the present invention will be described.

Figure 2A:
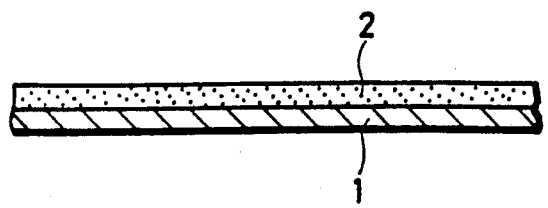
Figure 2B:
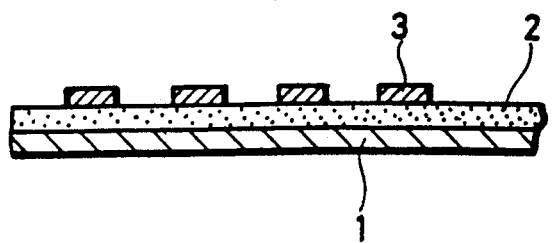

As shown in a cross-sectional view of FIG. 2 (a), a ceramic green sheet 2 mainly composed of dielectric ceramics is first formed on a supporting film 1 made of synthetic resin such as polyethylene terephthalate using a film forming process such as a doctor blade process.

As shown in FIG. 2 (b), an electrode paste 3 mainly composed of Ag, Ag-Pd and Ni is then applied on the above ceramic green sheet 2 by a coating process such as screen process printing. The electrode paste 3 is applied so as to form an inner electrode as described later.

Figure 3:
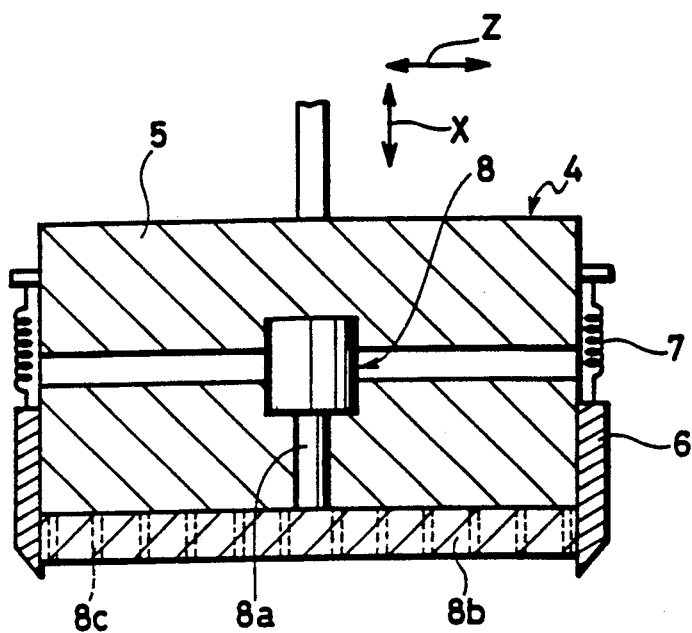

Then, the above ceramic green sheet 2 is cut using a cutting head 4 shown in FIG. 3. This cutting head 4 is so constructed as to be moved in the X and Z directions as shown by driving means (not shown). An annular cutting edge 6 is attached to the periphery of a main body 5 of the cutting head 4. The cutting edge 6 is attached to the main body 5 through a compression spring 7 as schematically shown.

Furthermore, the cutting head 4 is so constructed that an air cylinder is contained in the main body 5, and a cylinder head 8b fixed to an end of a cylinder rod 8a of the air cylinder 8 is moved in the directions represented by arrows as shown. In addition, this cylinder head 8b is provided with a plurality of through holes 8c. The through holes 8c are provided to draw and hold a ceramic green sheet which is brought into contact with the lower surface of the cylinder head 8b by drawing means not shown).

The annular cutting edge 6 projects downward beyond the cylinder head 8b by a small amount when the cutting head 4 is raised and compression spring 7 is in its uncompressed state as shown in FIG. 3. This is for ensuring that the cutting edge 6 contacts the ceramic green sheet 2 before the cylinder head 8b in the cutting process as described later, and the cylinder head 8b contacts the ceramic green sheet 2 after the cutting is completed.

As shown in FIG. 1, a ceramic green sheet 2, together with a supporting film 1, is arranged on a supporting base 9 in which a vacuum stage 9a is formed, and the ceramic green sheet 2 is cut to a predetermined size using the above cutting head, and then is directly drawn by drawing means (not shown) and held in contact with the lower surface of a cylinder head 8b. In FIG. 1, an electrode paste is not illustrated.

Thereafter, the cutting head is moved in the direction represented by an arrow, to transfer the ceramic green sheet cut to a metallic mold 10 for heat-pressing.

The above described cutting, holding and transferring steps are repeated, thereby to laminate a plurality of ceramic green sheets each having an inner electrode 3 printed thereon in the metallic mole 10 for heat-pressing. In this case, the ceramic green sheet 2 is stripped by the above cutting head from the supporting film 1, and drawn into and held by the cutting head 4, transferred to the metallic mold 10 for heat-pressing and laminated. Accordingly, even when a thin ceramic green sheet 2 having a thickness of 20 μm or less is used, the ceramic green sheet 2 held in cutting head 4 is not crumpled or torn and is accurately laminated.

A laminated body obtained by lamination in the metallic mold 10 for heat-pressing is then heated and pressed by applying pressure in the direction of the lamination. Thereafter, the laminated body is taken out of the metallic mold 10 and cut to the predetermined size of each multilayer capacitor.

Finally, a multilayer capacitor can be obtained through a sintering step and a step of providing an outer electrodes which are well-known in methods of fabricating a multilayer capacitor.

In fabricating the multilayer capacitor as described above, obtained is a laminated body having dummy ceramic green sheets, that is, ceramic green sheets which are not coated with electrode paste, laminated at an upper part of the inner electrode. Accordingly even in the above described laminating step, a plurality of very thin ceramic green sheets each coated with the electrode paste 3 for forming an inner electrode are laminated and then, one or more ceramic green sheets not coated with electrode paste 3 can be laminated, thereby allowing to be obtained as in the conventional thick ceramic examples a ceramic capacitor in which an inner electrode is arranged in a sintered body.

One or more ceramic green sheets not coated with electrode paste may be also laminated on the lower side of the outermost ceramic green sheet having the inner electrode formed thereon.

Figure 4A:
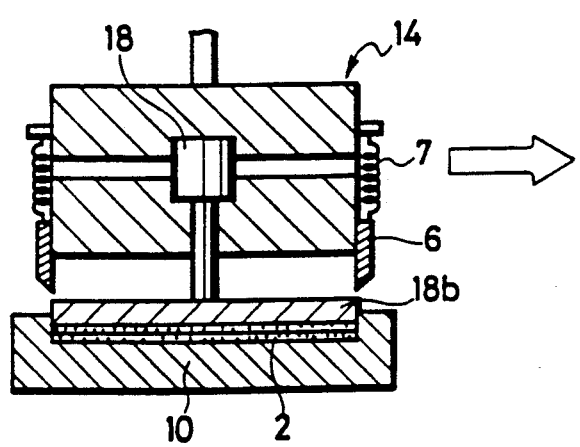
FIGS. 4 (a) and 4 (b) are cross sectional views for explaining the step of laminating a ceramic green sheet according to a second embodiment of the present invention.
Figure 4B:
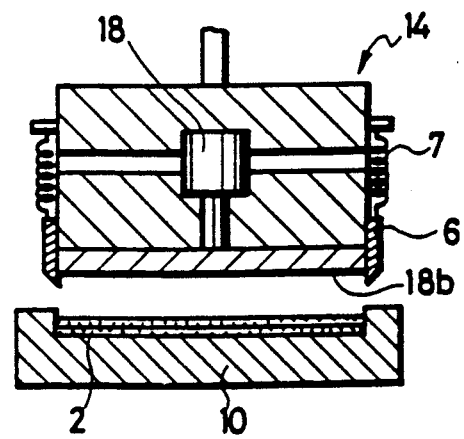

FIGS. 4 (a) and 4 (b) are cross-sectional views for explaining a second embodiment of the present invention.

The cutting head used in the second embodiment differs from that in the first embodiment.

When the cutting head shown in FIG. is used, the ceramic green sheet 2 drawn into and held by the cutting head 4 is dropped in the metallic mold 10 for heat-pressing by releasing suction, to be laminated. In this case, a shift in position of the ceramic green sheet to be laminated may be caused by a static charge produced in stripping the ceramic green sheet from a cylinder head 8b.

In the cutting head In the second embodiment, the amount of up and down movement of a cylinder head 18b of an air cylinder 18 contained in a main body 14 of the cuttIng head is made larger so as to prevent the above described shift in position of the ceramic green sheet. More specifically, as shown in FIG. 4 (a), a ceramic green sheet 2 held in an end of the cylinder head 18b is laminated so as to be pressed on the ceramic green sheet in the metallic mold 10 for heat-pressing by applying pressure and then, suction is released, and the cylinder head 18b is moved upward (see FIG. 4 (b)). thereby allowing the ceramic green sheet 2 to be laminated with high precision. In this case, in order to separate the ceramic green sheet 2 from the cylinder head 18b, gas such as air may be emitted out through holes (they are not shown in FIGS. 4 (a) and 4 (b) but through holes such as the through holes 8c shown in FIG. 3 may be utilized). The second embodiment shown in FIGS. 4 (a) and 4 (b) are the same as the first embodiment shown in FIGS. 1 to 3 except for the foregoing and hence, the detailed description thereof is not repeated.

Therefore, in the second embodiment, the ceramic green sheet can be laminated in the metallic mold 10 for heat-pressing with higher precision, thereby allowing a small-sized and large capacity multilayer capacitor to be more reliably obtained.

The shape of the cutting edge 6 of the above described cutting head is suitably changed depending on a plane shape of a desired multilayer capacitor. In general, the cutting edge 6 has a square annular shape. In addition, although in the above described embodiments, the laminated body is further cut to obtain a respective laminated body for each multilayer capacitor, the ceramic green sheet 2 may be cut for each multilayer capacity by setting the size of the cutting edge 6 to one conforming to the size of a single multilayer capacitor, followed by the laminating step, the step of applying pressure and the subsequent steps.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of fabricating a multilayer capacitor, comprising the steps of:

forming a ceramic green sheet which is so thin that it cannot be handled accurately without additional support, and supporting said ceramic green sheet on a supporting film;

applying an electrode paste for forming an inner electrode on said ceramic green sheet;

cutting said ceramic green sheet supported on said supporting film to a predetermined size by employing a cutting head having drawing means, and drawing and holding the ceramic green sheet into the cutting head, to strip the same from said supporting film;

transferring the ceramic green sheet transversely away from said supporting film, while held in said cutting head, to a metallic mold; and laminating a plurality of ceramic green sheets in said metallic mold to obtain a laminated body by repeating said step of stripping the ceramic green sheet of predetermined size from said supporting film and said step of transferring the ceramic green sheet to said metallic mold;

wherein said cutting head comprises a main body containing an air cylinder and a cylinder head fixed to a cylinder rod portion of said air cylinder, and so constructed that said cylinder head can be moved by the air cylinder between a position close to the main body and a position separated from the main body;

wherein a plurality of section holes connected to the drawing means is formed in said cylinder head; and wherein said cylinder head is driven in a direction that is away from the main body subsequent to the step of transferring the ceramic green sheet held in said cutting head to the metallic mold, thereby causing the ceramic green sheet to enter the metallic mold.

2. The method according to claim 1, wherein gas is emitted from the plurality of suction holes in the cylinder head, thereby separating the ceramic green sheet held from said cylinder head.

3. The method according to claim 1, wherein the ceramic green sheet held in said cylinder head is pressed onto the ceramic green sheet in the metallic mold by applying pressure to laminate the ceramic green sheet held in said cylinder head onto the ceramic green sheet in the metallic mold, and then the cylinder head is moved out of the metallic mold.

4. The method according to claim 3, wherein gas is emitted from the plurality of suction holes in the cylinder head, thereby separating the ceramic green sheet from said cylinder head.

5. The method according to claim 1, wherein the ceramic green sheet held in said cylinder head is dropped into the metallic mold by releasing suction, to laminate the ceramic green sheet held in said cylinder head onto a ceramic green sheet in the metallic mold.

6. The method according to claim 5, wherein gas is emitted from the plurality of suction holes in the cylinder head, thereby separating the ceramic green sheet held from said cylinder head.

7. The method according to any one of claims 1–6, wherein said ceramic green sheet is substantially 20 microns or less in thickness.

* * * * *